United States Patent Office 3,411,889
Patented Nov. 19, 1968

3,411,889
SULFAMIDE
Ludwik I. Kopec, Wilmington, Del., assignor to Allied Chemical Corporation, New York, N.Y., a corporation of New York
No Drawing. Filed Mar. 7, 1966, Ser. No. 532,057
6 Claims. (Cl. 23—357)

ABSTRACT OF THE DISCLOSURE

In the preparation of sulfamide and ammonium fluoride from sulfuryl fluoride and ammonia according to the equation: $SO_2F_2 + 4NH_3 \rightarrow SO_2(NH_2)_2 + 2NH_4F$, it has been discovered that if the reaction is carried out at low temperature in the presence of excess anhydrous ammonia a separation of the products by filtration may be achieved in that $SO_2(NH_2)_2$ is soluble in the liquid ammonia, whereas the $NH_4F$ is insoluble and is, therefore, susceptible to separation by filtration.

---

This invention is directed to a new and improved process for the preparation of sulfamide. More specifically, this invention is directed to a new and improved process for recovery of sulfamide produced by reacting sulfuryl fluoride with ammonia.

In the prior art sulfamide has usually been produced by the steps of reacting sulfuryl chloride with ammonia, expelling the ammonia, separating the sulfamide from the resulting reaction mass by extraction with a suitable solvent (such as acetone or methyl acetate), and recovering the sulfamide by distilling off the solvent. In addition to ammonium chloride, by-products consisting mainly of imido sulfamides $H_2N \cdot SO_2 \cdot NH \cdot SO_2NH_2$ and $$H_2N \cdot SO_2 \cdot (NHSO_2)_4 NH_2$$

and sulfamic acid $OH \cdot SO_2 \cdot NH_2$ remain in the reaction mass after extraction of the sulfamide. By controlled hydrolysis, involving dissolving the reaction mass in water, maintaining the aqueous solution at room temperature for a number of days, distilling off the water and extracting the residue with a suitable solvent, additional sulfamide can be recovered from these by-products. This process has the obvious disadvantages of being very time consuming and quite complex.

Another method for production of sulfamide which is known is to react sulfuryl fluoride with ammonia, expel the ammonia, and separate the sulfamide from the resulting reaction mass by extraction with a solvent. The use of sulfuryl fluoride avoids most of the formation of by-products of the sulfuryl chloride process and thus eliminates the need for a hydrolysis step. Use of sulfuryl fluoride also results in higher yields than are achieved using sulfuryl chloride. However, this process has the disadvantage of requiring solvent extraction of the sulfamide using solvents which cause slow decomposition of sulfamide (the most commonly used being methyl acetate and acetone).

This invention provides a simple and economical process for the production of sulfamide which avoids most formation of by-products other than ammonium fluoride and thus avoids the need for a hydrolysis step, and which further avoids the need for sulfamide extraction with a sulfamide-deteriorating solvent.

It has been discovered that sulfamide is soluble in ammonia, while ammonium fluoride is not, thus enabling use of the following novel process:

(1) Gaseous sulfuryl fluoride ($SO_2F_2$) is reacted with an excess of liquid anhydrous ammonia to form sulfamide ($SO_2(NH_2)_2$), which dissolves in the liquid ammonia, and ammonium fluoride ($NH_4F$), which does not dissolve but forms a slurry with the liquid ammonia.

(2) The slurry is separated by filtration or other conventional means to remove the ammonium fluoride, under conditions which maintain the ammonia in liquid form.

(3) Sulfamide is recovered from the filtrate by expelling the ammonia.

(4) Optionally, the ammonium fluoride residue from the filtration is washed with ammonia, the ammonium fluoride is again filtered out, and ammonia is expelled from the filtrate to recover additional sulfamide. This latter step may be repeated several times if desired.

This process has the advantages that:

(1) As a whole by-products other than ammonium fluoride are avoided. Thus no time-consuming hydrolysis step is required, as was required by the sulfuryl chloride process.

2) Higher yields are achieved than with the sulfuryl chloride process.

(3) No extraction of sulfamide with a sulfamide-deteriorating solvent is required, as was required by both the sulfuryl chloride and prior sulfuryl fluoride processes.

(4) Ammonia serves as a raw material, a reaction medium, and a selective solvent, thus giving rise to a much simpler process than those of the prior art.

The preferred method of carrying out the reaction step is to gas liquid ammonia with sulfuryl fluoride, optionally stirring or otherwise agitating the liquid while gassing. Anhydrous ammonia should be used, to prevent contamination of the product with ammonium fluoride, which is soluble in water. This gassing is preferably carried out at atmospheric pressure at a temperature within the range of about $-34°$ to $-77°$ C., which is the range between the boiling and freezing point of ammonia at atmospheric pressure. Although higher reaction temperatures can be used with correspondingly higher pressures, temperatures above about 5° C. have been found to favor formation of undesirable by-products. The preferred reaction temperature is about $-40°$ C. The total mol ratio of charged ammonia to charged sulfuryl fluoride should be within the range between 10:1 and 100:1 before separation of the ammonium fluoride. After reaction, the resultant mol ratio of ammonia to sulfamide is from 6:1 to 96:1. Below a 10:1 mol ratio of ammonia to sulfuryl fluoride the slurry formed is so thick as to be impractical to work with, and above a 100:1 mol ratio the process tends to become uneconomical due to lowered productivity. The preferred mol ratio is between 20:1 and 50:1. The gassing rate is important only to the extent that it should be rapid enough for the reaction to be completed in a reasonable time but not so rapid as to cause excessive turbulence in the reaction vessel or to cause too high a local temperature rise. It is preferred to conduct the reaction step of the process in the presence of the full quantity of ammonia required to form a workable slurry. However, the reaction step can also be carried out by initially employing only a sufficient excess of ammonia to insure substantially complete reaction of the sulfuryl fluoride. In the latter case, sufficient additional ammonia is added after the sulfuryl fluoride is charged to bring the mol ratio within the above-specified range before separation of the ammonium fluoride.

The resulting slurry is treated to separate the insoluble ammonium fluoride by-product. Although filtration is the preferred method of separation, other conventional methods such as centrifuging can be used. The filtration step must be carried out under conditions such as to keep the ammonia in liquid form. These conditions are about $-34°$ to $-77°$ C. at atmospheric pressure. The pressure of an inert gas or a vacuum pump is used to force the filtrate through a conventional filter such as one composed of stainless steel screens. The use of nitrogen pressure is preferred, and a pressure of about 20 to 30 p.s.i.g. has been found to be satisfactory. With these pressures, corresponding increases in temperature may be used, governed by the vapor pressure curve of ammonia. At the above-mentioned pressures the corresponding temperatures are about −27° C. and −18° C., respectively.

After filtration, sulfamide is recovered by expelling the ammonia from the filtrate by the use of increased temperature or reduced pressure, while shielding the filtrate from atmospheric moisture by use of a one-way valve. The preferred initial temperature and pressure are about −33° C. and 14.7 p.s.i.g., respectively.

After the initial filtration, it is preferred to wash the filtration residue with ammonia and refilter it, recovering additional sulfamide from the filtrate in the same manner as described above. It has been found that two additional washing and filtration steps after the initial recovery will result in a total process yield of about 80–90%. The ammonia recovered from the filtrate can be recovered and reused for washing and reaction purposes.

The following are specific examples of the practice of the process of this invention, in which parts are by weight.

EXAMPLE I 470 parts of anhydrous ammonia were condensed in a vessel equipped with stirrer, which vessel was partially immersed in an isopropanol/Dry Ice bath. 95 parts of sulfuryl fluoride were introduced over a 1 hour and 35 minute period at approximately −65° C., while vigorously stirring, and the mixture was stirred for an additional hour. The stirrer was then removed, a filtration tube was put in, and the slurry was filtered using nitrogen pressure to force the liquid through the filtration tube. The filtrate collected was allowed to evaporate at atmospheric temperature and pressure while protecting against incoming moisture by the use of a one-way valve. After standing overnight the residual ammonia was evacuated under reduced pressure and mild heating.

39 parts of sulfamide, which melted at 89–91° C., were obtained. (Melting point of the pure product: 93–94° C.) This was a 43.5% yield based on sulfuryl fluoride.

EXAMPLE II 300 parts of anhydrous ammonia were condensed in a vessel provided with a partition for filtration and a reflux condenser with isopropanol and Dry Ice in its jacket. 60 parts of sulfuryl fluoride were introduced over approximately 1 hour, without agitation, at a temperature of approximately −40° C. The slurry was filtered by applying a mild suction to the receiver to force the liquid through the partition. 17.5 parts of sulfamide with a melting point of 91–91.5° C. were recovered after expelling ammonia from the liquor collected in the receiver, a 31.2% yield based on sulfuryl fluoride.

EXAMPLE III 190 parts of anhydrous ammonia were condensed into a vessel having a partition enabling filtration. The vessel was partially immersed in an isopropanol/Dry Ice bath. 23 parts of sulfuryl fluoride were introduced over 45 minutes. No agitation was provided. The slurry was filtered by using nitrogen pressure to force it against the partition. Filtrate was collected in a receiver provided with a one-way valve (fraction 1). 225 parts of ammonia were added to the residue in the vessel and the residue was filtered again (fraction 2). Another 215 parts of ammonia were added to the residue and it was filtered again (fraction 3). After final filtration the residue was removed from the vessel with acetone, filtered and dried. The dried residue consisted of 16.0 parts of ammonium fluoride. The ammonia in the receiver was evacuated under reduced pressure. Dry solid sulfamide with a melting point of 89–91° C. was obtained in the following quantities:

|  | Grams |
|---|---|
| Fraction 1 | 8 |
| Fraction 2 | 9 |
| Fraction 3 | 2 |
| Total | 19 |

This was an 88% yield based on sulfuryl fluoride.

While the invention has been described with particular reference to specific embodiments, it is to be understood that it is not to be limited thereto but is to be construed broadly and restricted solely by the scope of the appended claims.

I claim:
1. The process of preparing sulfamide comprising:
   (a) reacting sulfuryl fluoride ($SO_2F_2$) with an excess of liquid anhydrous ammonia to form the sulfamide ($SO_2(NH_2)_2$), which dissolves in the liquid ammonia and ammonium fluoride ($NH_4F$), which is insoluble in liquid ammonia,
   (b) separating the insoluble $NH_4F$, and
   (c) recovering the sulfamide from the liquid ammonia.
2. The process of claim 1 wherein the reaction temperature is below about 5° C., and the total mol ratio of ammonia charged to sulfuryl fluoride charged is in the range between 10:1 and 100:1 before separation of the ammonium fluoride.
3. The process of claim 2 wherein the mol ratio of ammonia initially charged to sulfuryl fluoride charged is in the range between 10:1 and 100:1.
4. The process of claim 3 wherein said mol ratio range is between 20:1 and 50:1.
5. The process of claim 2 wherein the mol ratio of ammonia initially charged to sulfuryl fluoride charged is below 10:1 and before separation of the ammonium fluoride additional liquid ammonia is added to attain the mol ratio range between 10:1 and 100:1.
6. The process of claim 1 including at least one additional step of washing the separated solid ammonium fluoride residue with liquid ammonia, separating the remaining solid ammonium fluoride residue, and recovering additional sulfamide by evaporating the ammonia from the separated wash liquid.

References Cited

UNITED STATES PATENTS 3,017,240   1/1962   Cramer ............ 23—357

FOREIGN PATENTS 770,789   3/1957   Great Britain.

OSCAR R. VERTIZ, *Primary Examiner.*

H. S. MILLER, *Assistant Examiner.*